United States Patent
Koike

(10) Patent No.: US 8,994,840 B2
(45) Date of Patent: Mar. 31, 2015

(54) APPARATUS, METHOD, AND COMPUTER-READABLE STORAGE MEDIUM FOR COMMUNICATING BETWEEN DEVICES OF AN IMAGE CAPTURING SYSTEM

(71) Applicant: Canon Kabushiki Kaisha, Tokyo (JP)

(72) Inventor: Kohtaro Koike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/776,357

(22) Filed: Feb. 25, 2013

(65) Prior Publication Data

US 2013/0222628 A1    Aug. 29, 2013

(30) Foreign Application Priority Data

Feb. 27, 2012    (JP) ................... 2012-040484

(51) Int. Cl.
- *H04N 5/232* (2006.01)
- *H04N 5/222* (2006.01)
- *H04N 5/225* (2006.01)

(52) U.S. Cl.
CPC ......... *H04N 5/23203* (2013.01); *H04N 5/2256* (2013.01)
USPC ................... 348/211.3; 348/211.2; 348/211.9; 348/211.11; 348/370; 348/371

(58) Field of Classification Search
CPC ............ H04N 5/2256; H04N 5/23203; H04N 13/0296; H04N 5/232
USPC .......................... 348/370, 371, 211.1–211.9; 396/155–206
See application file for complete search history.

(56) References Cited

U.S. PATENT DOCUMENTS

| | | | |
|---|---|---|---|
| 6,748,165 B2 * | 6/2004 | Ogasawara | 396/56 |
| 7,633,547 B2 * | 12/2009 | Watanabe et al. | 348/371 |
| 8,116,620 B2 * | 2/2012 | King | 396/56 |
| 8,526,808 B2 * | 9/2013 | Clark | 396/157 |
| 8,532,476 B2 * | 9/2013 | Clark | 396/56 |
| 8,614,766 B1 * | 12/2013 | Clark | 348/370 |
| 2002/0009296 A1 * | 1/2002 | Shaper et al. | 396/56 |
| 2002/0061190 A1 * | 5/2002 | Kawasaki et al. | 396/157 |
| 2002/0171741 A1 * | 11/2002 | Tonkin et al. | 348/211.3 |
| 2004/0179133 A1 * | 9/2004 | Battles et al. | 348/370 |
| 2005/0174473 A1 * | 8/2005 | Morgan et al. | 348/370 |
| 2006/0056056 A1 * | 3/2006 | Ahiska et al. | 359/690 |
| 2006/0082663 A1 * | 4/2006 | Rooy et al. | 348/231.99 |
| 2006/0182431 A1 * | 8/2006 | Kobayashi et al. | 396/59 |
| 2006/0187336 A1 * | 8/2006 | Rosenberg | 348/370 |
| 2008/0298793 A1 | 12/2008 | Clark | |

(Continued)

FOREIGN PATENT DOCUMENTS

| | | |
|---|---|---|
| JP | 2011-061715 A | 3/2011 |
| JP | 2011-107493 A | 6/2011 |

*Primary Examiner* — Chia-Wei A Chen
(74) *Attorney, Agent, or Firm* — Canon U.S.A., Inc. IP Division

(57) ABSTRACT

A communication device in a system including a first device and a second device includes an input unit configured to receive a predetermined control command, and a shift unit configured to cause the wireless communication unit to shift to any of operation modes including a reception mode for receiving a signal from another device and a transmission mode for not receiving a signal from another device. In a case where the input unit receives a control command, the shift unit causes the wireless communication unit to shift to the transmission mode without shifting to the reception mode.

14 Claims, 5 Drawing Sheets

(56) References Cited

U.S. PATENT DOCUMENTS

| | | | |
|---|---|---|---|
| 2009/0079838 A1* | 3/2009 | Storm | 348/211.2 |
| 2010/0073483 A1* | 3/2010 | Squillante et al. | 348/159 |
| 2011/0050925 A1 | 3/2011 | Watanabe | |
| 2011/0063462 A1 | 3/2011 | Koike | |
| 2011/0119405 A1* | 5/2011 | Parr et al. | 710/4 |
| 2012/0050606 A1* | 3/2012 | Debevec et al. | 348/370 |
| 2012/0194712 A1* | 8/2012 | Crook et al. | 348/262 |
| 2012/0212630 A1* | 8/2012 | Pryor | 348/207.1 |
| 2012/0239820 A1* | 9/2012 | Dziezanowski | 709/230 |
| 2012/0257095 A1* | 10/2012 | Velazquez | 348/333.01 |
| 2013/0002897 A1* | 1/2013 | Imafuji et al. | 348/220.1 |
| 2013/0100340 A1* | 4/2013 | Clark | 348/370 |
| 2013/0253701 A1* | 9/2013 | Halloran et al. | 700/245 |
| 2014/0009671 A1* | 1/2014 | Ozone et al. | 348/371 |

\* cited by examiner

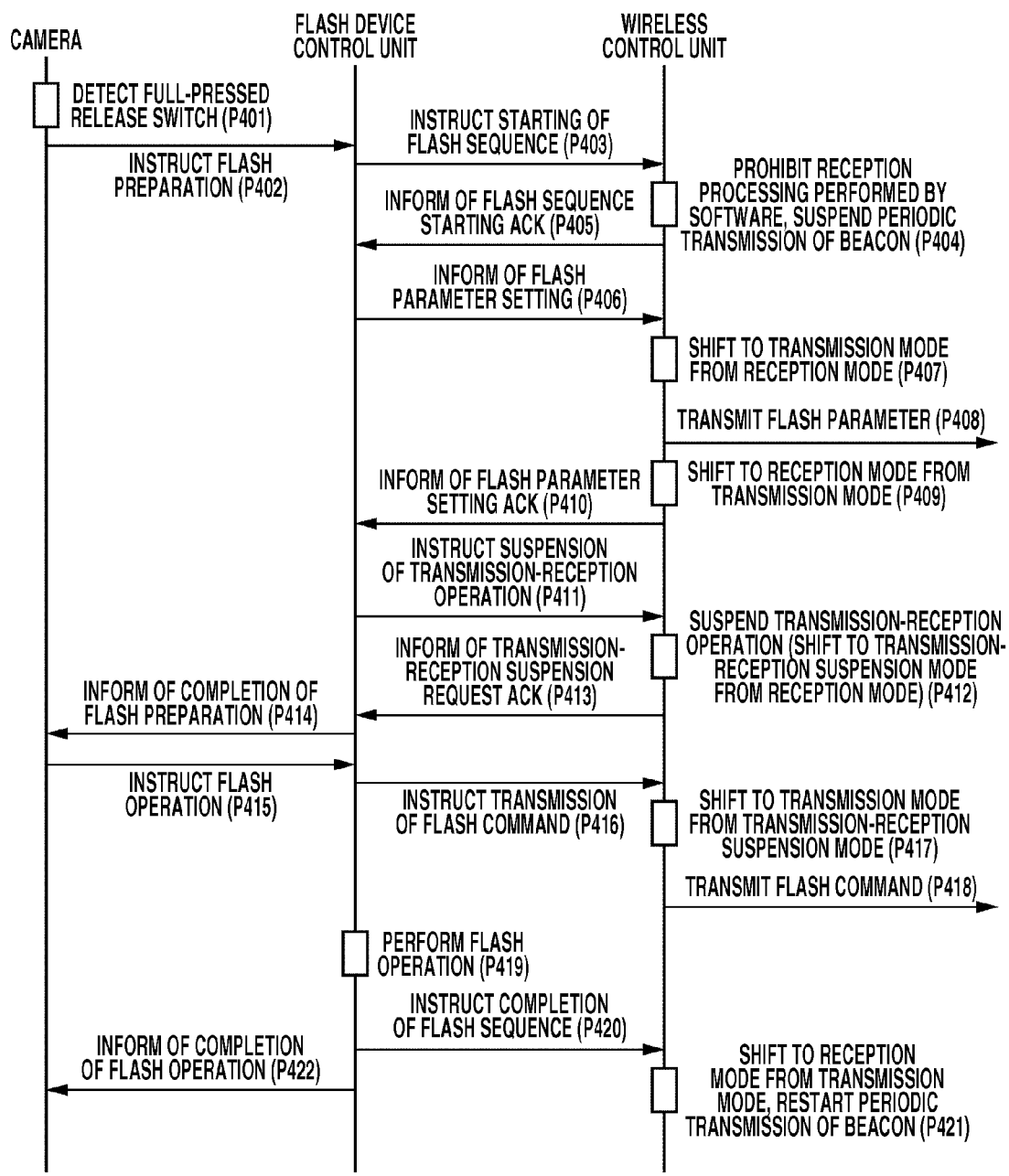

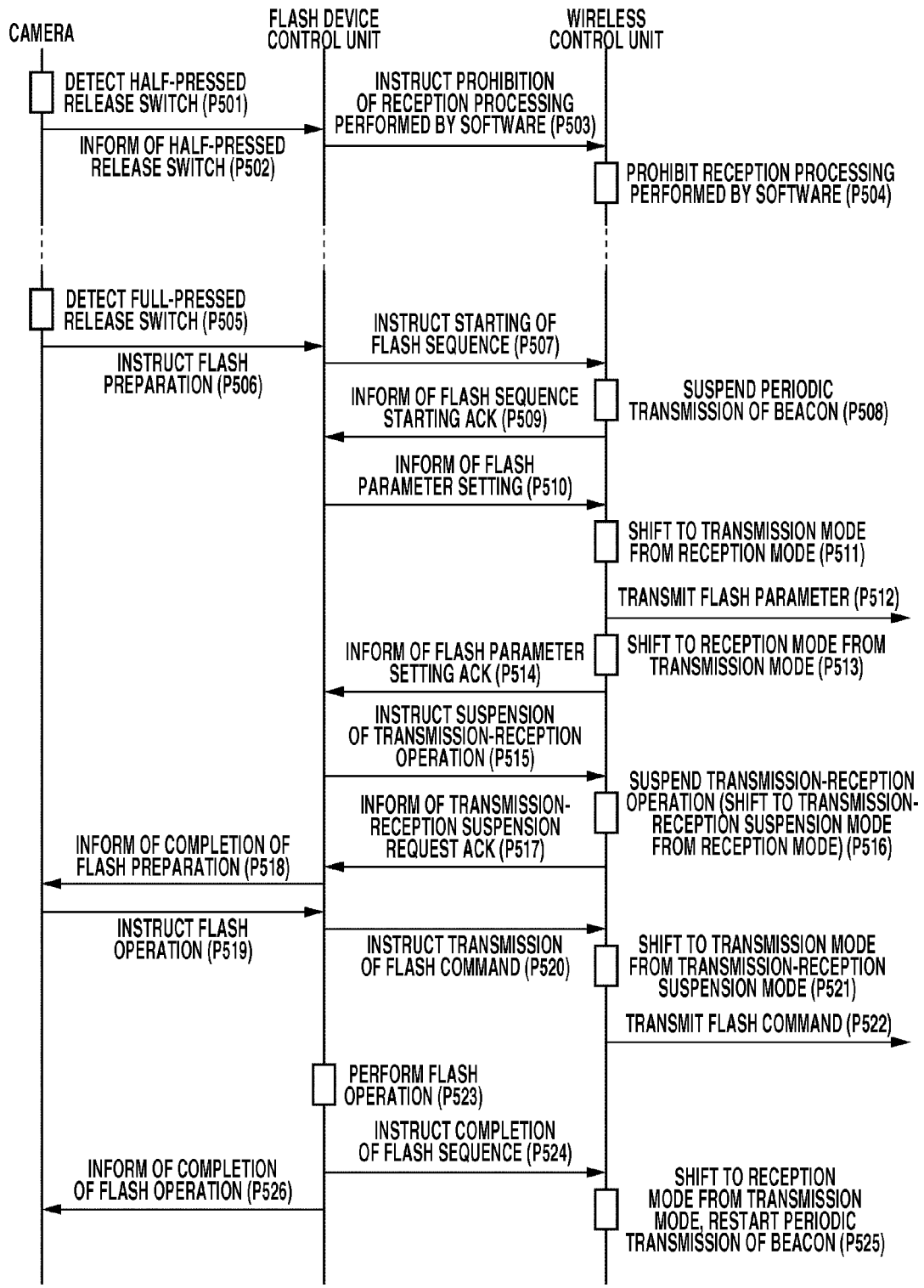

APPARATUS, METHOD, AND COMPUTER-READABLE STORAGE MEDIUM FOR COMMUNICATING BETWEEN DEVICES OF AN IMAGE CAPTURING SYSTEM

BACKGROUND OF THE INVENTION

1. Field of the Invention

The present invention relates to a technique for controlling a communication device including a communication unit.

2. Description of the Related Art

A specific system such as an image capturing system performs processing such as image capturing processing or flash processing that requires strict timing. Therefore, in comparison to an ordinary device employing a wireless communication system, the image capturing system is considerably influenced by transmission delay or transmission failure. Accordingly, the image capturing system requires communication with more precise timing. Therefore, Japanese Patent Application Laid-Open No. 2011-61715 discusses a technique for realizing a rapid response by making a sleep period shorter when an image capturing sequence is started.

SUMMARY OF THE INVENTION

According to an aspect of the present invention, a communication device adapted for use in an image capturing system including an image capturing device and at least one further device includes an interface configured to communicate with the image capturing device, a wireless communication unit configured to wirelessly communicate with said at least one further device in the image capturing system, an input unit configured to receive a flash command relating to said at least one further device in the image capturing system, and a shift unit configured to cause the wireless communication unit to shift between operation modes including a reception mode for receiving a signal from another device and a transmission mode for not receiving a signal from another device, wherein, in a case where the input unit receives a flash command, the shift unit causes the wireless communication unit to shift to the transmission mode without shifting to the reception mode, wherein the wireless communication unit is adapted to transmit the flash command to said at least one further device after shifting to the transmission mode.

The invention extends to methods, apparatus and/or use substantially as herein described with reference to the accompanying drawings. Any feature in one aspect of the invention may be applied to other aspects of the invention, in any appropriate combination. In particular, features of method aspects may be applied to apparatus aspects, and vice versa. Furthermore, features implemented in hardware may generally be implemented in software, and vice versa. Any reference to software and hardware features herein should be construed accordingly. Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a sequence diagram illustrating processing according to a first exemplary embodiment.

FIG. 5 is a sequence diagram illustrating processing according to a second exemplary embodiment.

DESCRIPTION OF THE EMBODIMENTS

Various exemplary embodiments, features, and aspects of the invention will be described in detail below with reference to the drawings.

Figure 1:
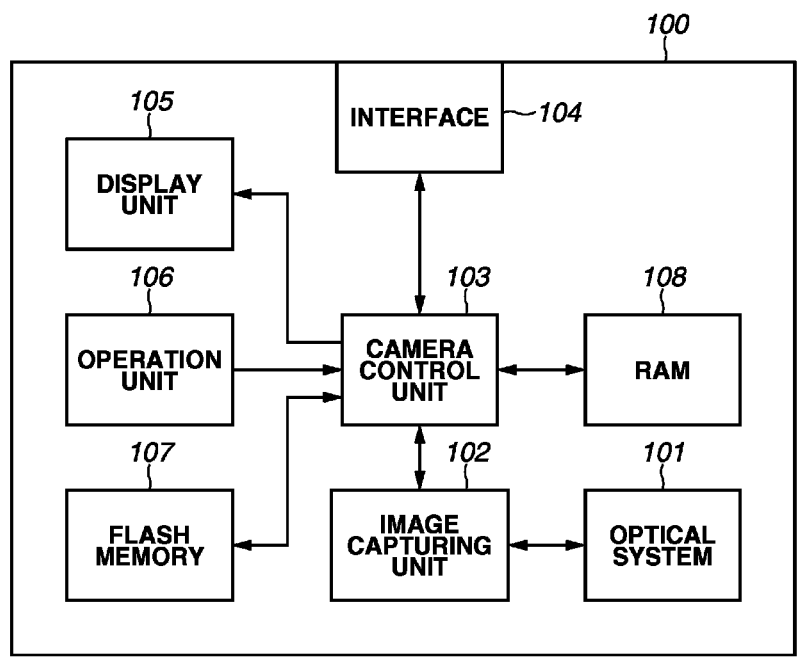
FIG. 1 illustrates a configuration example of a camera.

FIG. 1 illustrates an example of a hardware configuration of a camera according to an exemplary embodiment of the present invention.

<Hardware Configuration>

A configuration of a camera serving as an example of an image capturing device will be described with reference to FIG. 1. In addition to a digital camera which provides an image capturing function as a main function thereof, a camera-equipped mobile phone, a camera-equipped tablet terminal, and so on can be employed as an image capturing device.

FIG. 1 is a system block diagram illustrating an example of a configuration of a camera according to a first exemplary embodiment. A camera 100 exemplifies an image capturing device according to the present exemplary embodiment. An optical system 101 includes a lens, a shutter, and a diaphragm.

An image capturing unit 102 converts light passing through the optical system 101 into an image. A camera control unit 103 executes calculation according to a signal and a program input thereto from each unit included in the camera 100. Then, the camera control unit 103 performs various types of control processing for each unit such as image capturing control, storage control, display control, and communication control. An interface 104 connects to an external device and realizes communication with the external device by inputting and outputting a control command and data. A display unit 105 displays a view finder image and a captured image when an image is captured. The display unit 105 also displays text via a graphical user interface (GUI).

An operation unit 106 receives a user operation. The operation unit 106 includes, for example, a button, a switch, a dial, and a touch panel. The operation unit 106 according to the present exemplary embodiment includes a release button. The release button includes two switches, SW1 and SW2. An instruction for image capturing preparation is provided when the switch SW1 is pressed halfway through (i.e., "half-pressed state"), whereas an actual image capturing instruction is provided when the switch SW2 is fully pressed (i.e., "full-pressed state").

A non-volatile memory 107 is a storage medium in which image data, various parameters, a program, and the like are stored therein. The non-volatile memory 107 may be detachably mounted on the camera 100. A random access memory (RAM) 108 temporarily stores various types of data and is also used as a work area for various types of processing.

For example, if an image capturing command is issued to the camera control unit 103 via the operation unit 106, the camera control unit 103 instructs the image capturing unit 102 to capture an image. Then, the image capturing unit 102 inputs a signal to the optical system 101, so that the optical system 101 forms an image with the light from an object in the image capturing unit 102 at an appropriate light amount and timing. Accordingly, the camera 100 performs image capturing processing.

The communication between the camera 100 and a flash device 200 (FIG. 2) is executed via the interface 104. By an operation performed on the operation unit 106 or an operation performed on the flash device 200 connected thereto via the interface 104, an operation mode and a parameter for wireless communication of the camera 100 are changed and stored in the non-volatile memory 107. Then, the camera control unit 103 can cause the display unit 105 to display information to reflect the change.

Figure 2:
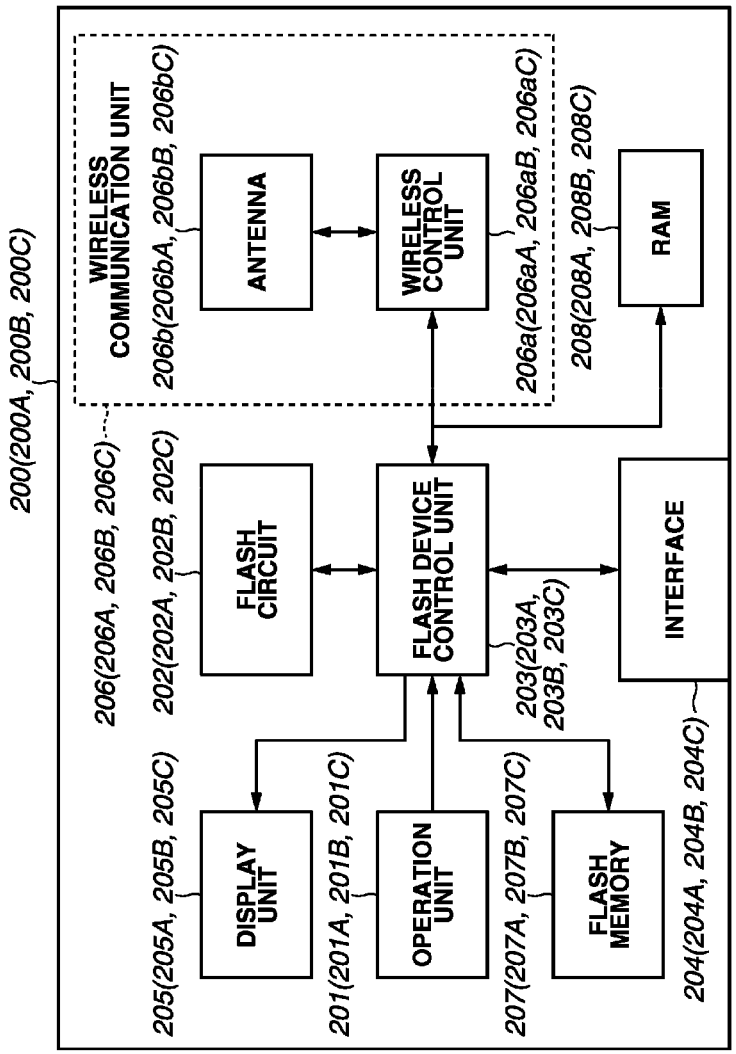
FIG. 2 illustrates a configuration example of a flash device.

FIG. 2 is a system block diagram illustrating a configuration example of the flash device 200 serving as an accessory of the image capturing device according to the present exemplary embodiment. The flash device 200 exemplifies a flash device according to the present exemplary embodiment. An operation unit 201 receives a user operation. The operation unit 201 includes, for example, a button, a switch, a dial, and a touch panel.

A flash circuit 202 of the flash device 200 is a circuit for executing a flash operation. Various settings and a program are stored in a non-volatile memory 207. A RAM 208 temporarily stores various types of data and is also used as a work area for various types of processing.

A flash device control unit 203 controls each unit of the flash device 200 according to a signal and a program input from each unit included in the flash device 200.

An interface 204 connects to an external device to transmit and receive a control command and data. According to the present exemplary embodiment, the flash device control unit 203 communicates with the camera 100 via the interface 204.

A display unit 205 displays text via the GUI. In particular, according to the present exemplary embodiment, the flash device control unit 203 updates the content of the display unit 205 when the flash control device 203 is informed of, by a user operation or from the camera 100 via the interface 204, change in a parameter value, such as an amount of light flashed by the flash device 200 and a parameter value for a wireless channel.

A wireless communication unit 206 is a wireless communication interface included in the flash device 200. According to the present exemplary embodiment, the wireless communication unit 206 is a radio frequency (RF) circuit including a wireless control unit 206a and an antenna 206b. The wireless control unit 206a includes a memory in which a program for controlling the wireless communication unit 206 is stored. There are two types of configurations of the wireless communication unit 206. One is a built-in type where the wireless communication unit 206 is built into the flash device 200, and the other is a detachable type where the wireless communication unit 206 is formed as a card while the flash device 200 is provided with a card slot. According to the present exemplary embodiment, the built-in type wireless communication unit 206 will be described.

The wireless communication unit 206 will be described in detail. The flash device control unit 203 can instruct the wireless communication unit 206 to control other flash device which wirelessly communicate with the flash device 200. After receiving an instruction from the flash control unit 203, the wireless communication unit 206 can wirelessly transmit a control signal to the other flash device(s) based on the instruction from the flash device control unit 203.

According to the present exemplary embodiment, an operation mode of the wireless communication unit 206 can be shifted to three operation modes such as a reception mode, a transmission mode, and a transmission-reception suspension mode. The wireless control unit 206a can shift between these operation modes, and the flash device control unit 203 can instruct the wireless control unit 206a to shift the operation mode. Each of these operation modes will be described below.

In the reception mode, the wireless communication unit 206 can receive a signal from the other device. According to the present exemplary embodiment, when the flash device control unit 203 activates the wireless communication unit 206, the wireless communication unit 206 operates in the reception mode.

In the transmission mode, the wireless communication unit 206 transmits a signal to the outside. For example, in a case where the wireless communication unit 206 transmits a signal according to an instruction from the flash device control unit 203, the operation mode of the wireless communication unit 206 is shifted to the transmission mode. During the transmission mode, the wireless communication unit 206 does not receive a signal from the other device.

In the transmission-reception suspension mode, the wireless communication unit 206 does not perform both the transmission and the reception. In the transmission-reception suspension mode, for example, power consumption can be reduced by suspending the power supply to a region involved in transmission and reception of the signal of the wireless communication unit 206.

The operation modes in which the wireless communication unit 206 can shift has been described as above. In addition, aside from the above-described operation modes for the wireless communication unit 206, the flash device 200 according to the present exemplary embodiment can set software to limit the reception processing that is performed as one function of the software. For example, in a case where the software is set to be prohibited from receiving a signal, the flash device 200 can control the software not to perform processing of a signal if the antenna 206b receives such a signal. According to the present exemplary embodiment, the wireless control unit 206a performs the above control processing with respect to the software. However, the control processing may be performed by the flash device control unit 203.

One notable point in the above-described configuration is that the setting for prohibiting the software from processing a signal and the operation modes of the wireless communication unit 206 may be independent from each other. For example, even in a case where the software is prohibited from processing a signal, the wireless communication unit 206 may stay in the reception mode, in other words the wireless communication unit 206 operates as the RF circuit to maintain the reception state. This is because, as the RF circuit, it is enough to shift to the transmission mode only at the moment of transmission, and such an operation can reduce the power consumption.

<System Configuration>

Figure 3:
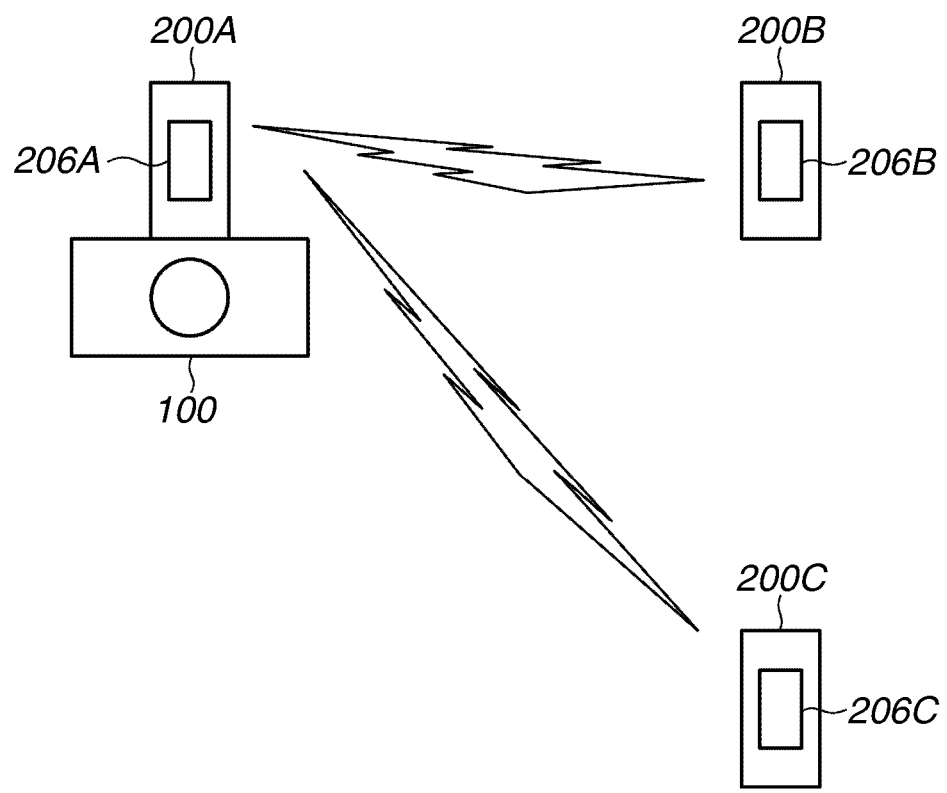
FIG. 3 illustrates a configuration example of an image capturing system.

FIG. 3 illustrates a configuration example of an image capturing system according to the present exemplary embodiment. The image capturing system includes the camera 100 and three flash devices 200A, 200B, and 200C. The flash devices 200A, 200B, and 200C are wirelessly connected with each other via wireless communication units 206A, 206B, and 206C. Each of the flash devices 200A, 200B, and 200C includes a hardware configuration as illustrated in FIG. 2, and components of the respective flash devices are indicated by suffix A, B, and C.

According to the present exemplary embodiment, a work role such as "master device" or "slave device" is allocated to each of the flash devices 200A, 200B, and 200C. A flash device serving as a master device transmits a flash command to a flash device serving as a slave device. A flash device serving as the slave device is controlled by the master device.

The slave device receives the flash command, and performs flash processing. In FIG. 3, the flash device 200A serves as a master flash device, whereas the flash devices 200B and 200C serve as slave flash devices. The camera 100 and the master flash device 200A are connected via the interfaces 104 and 204A to communicate with each other.

A master device setting and a slave device setting with respect to the flash devices 200A, 200B, and 200C will be described. For example, in a case where the setting of the flash device 200A is executed, in response to the master device setting and the slave device setting performed by a user via an operation unit 201A, the flash device 200A transmits the content of the setting to the flash devices 200B and 200C. The flash device control units 203B and 203C receive the setting content of the flash device 200A, and stores the setting content thereof in flash memories 207B and 207C. The setting content is also stored in a non-volatile memory 207A of the flash device 200A. Then, the flash device 200A activates the wireless communication unit 206A. At this time, the wireless communication unit 206A is activated in a reception mode described below. The wireless communication unit 206A reads out the master/slave setting from the non-volatile memory 207A, and operates either as a master flash device or as a slave flash device. In a similar manner, the flash devices 200B and 200C can be set either as the master flash device or as the slave flash device. In a case where information of the master flash device is stored in the non-volatile memory 207A, the wireless communication unit 206A periodically transmits a beacon to the other flash device connected thereto.

An outline of the control processing performed on the slave flash device according to the present exemplary embodiment will be described below.

First, the control processing performed on the slave flash devices 200B and 200C in FIG. 3 will be described. According to the present exemplary embodiment, control to flash the slave flash device can be performed according to the image capturing processing performed by the camera 100. When an instruction to capture an image is input to the camera 100, the camera 100 transmits a flash command to the flash device control unit 203 via the interface 104 and the interface 204A. The flash command (a data format of the flash command may be changed as appropriate) is transmitted to the wireless communication unit 206A.

Then, the wireless communication unit 206A transmits the flash command to the wireless communication units 206B and 206C. The flash command includes a timing signal so as to flash the slave flash devices 200B and 200C at the timing when a shutter is fully opened. The wireless communication units 206B and 207C receive the flash command, and respectively notify the flash device control units 203B and 203C of the flash command. According to the notified flash command, the flash device control units 203B and 203C instruct the flash circuits 202B and 202C to perform a flash operation. In this manner, the master flash device 200A controls the flash operation performed by the slave flash devices 200B and 200C. A series of the above-described processing is referred to as "flash control".

The flash control will be described in detail. First, the operation unit 106 performs an image capturing operation. According to the image capturing operation, the camera control unit 103 issues an image capturing command to the image capturing unit 102. Then, the image capturing unit 102 performs image capturing processing via the optical system 101.

On the other hand, when the operation unit 106 performs the image capturing operation, the camera control unit 103 instructs the flash device control unit 203A to transmit a flash command via the interfaces 104 and 204A. The flash device control unit 203A reads out the master/slave setting from the non-volatile memory 207A to check whether the flash device 200A itself is the master flash device. If the flash device control unit 203A determines that the flash device 200A is set as the master flash device, the flash device control unit 203A issues a flash command to the wireless communication unit 206A.

A wireless control unit 206aA transmits a flash command packet to an antenna 206bA. Then, the antenna 206bA transmits the flash command packet to antennas 206bB and 206bC. Then, wireless control units 206aB and 206aC receive the flash command packet from the antennas 206bB and 206bC, and notify the flash device control units 203B and 203C of the flash command, respectively. According to the notified flash command, the flash device control units 203B and 203C instruct flash circuits 202B and 202C to perform the flash operation. Accordingly, the slave flash devices 200B and 200C perform the flash operation.

According to the present exemplary embodiment, the camera 100 and the flash device 200A which are connected to each other via the interfaces 104 and 204A are described as a system. However, the master flash device 200A may be built into the camera 100. In other words, the present exemplary embodiment may have a system configuration which includes the camera 100, the flash device 200A built into the camera 100, the slave flash device 200B, and the slave flash device 200C.

Further, in addition to transmit a signal to the slave flash devices 200B and 200C, the master flash device 200A according to the present exemplary embodiment can receive a signal from each of the slave flash devices 200B and 200C. Examples of signals received from the slave flash device may include a master search signal, a flash command transmission request, and a release request. These signals will be described below.

First, a master search signal will be described. A master search signal is transmitted by the slave flash device to search for a master flash device in the vicinity. For example, when the master flash device receives the master search signal transmitted from the slave flash device, the master flash device returns a response command to the slave flash device which is a transmission source of the master search signal. Thus, the slave flash device that receives the response command can establish wireless communication with the master flash device.

Next, a flash command transmission request will be described. A flash command transmission request is a signal to be transmitted by the slave flash device to the master flash device to ask for transmission of a flash command, namely a signal for causing the slave flash device to flash, thereto. For example, in response to a user operation performed via a predetermined operation unit of the slave flash device, the flash command transmission request is transmitted to the master flash device. When the master flash device receives the flash command transmission request, the wireless communication unit 206 notifies the flash device control unit 203 of reception of the flash command transmission request.

In response to the notified flash command transmission request, the flash device control unit 203 instructs the wireless communication unit 206 to transmit a flash command. Then, the wireless communication unit 206 transmits the flash command to the slave flash device. As described above, the flash command transmission request can be used to trigger a flash operation by a user operation performed on the slave flash device.

Next, a release request (e.g. shutter release) will be described. A release request is a signal to be transmitted by the slave flash device to the master flash device in order to cause the camera 100 connected to the master flash device to be released. First, for example, in response to a user operation performed via the predetermined operation unit of the slave flash device, the release request is transmitted to the master flash device. When the master flash device receives the release request, the wireless communication unit 206 notifies the flash device control unit 203 of reception of the release request. Then, the flash device control unit 203 transmits the release request to the camera 100 via the interface 204.

The camera control unit 103 receives the release request via the interface 104, and starts an image capturing operation. Subsequent processing is performed in a similar manner to that performed when the release button is pressed. Therefore, the camera control unit 103 instructs the flash device control unit 203 to transmit a flash command. According to the instruction from the camera control unit 103, the flash device control unit 203 instructs the wireless communication unit 206 to transmit the flash command. Then, the wireless communication unit 206 transmits the flash command to the slave flash device. As described above, the release request can be used to trigger an image capturing sequence by a user operation performed on the slave flash device.

The three signals to be transmitted from the slave flash device are described. These signals are transmitted to the wireless communication unit 206 of the master flash device in an asynchronous manner. In other words, as long as the master flash device 200 is in a receivable state of a signal from the outside, the master flash device can receive these signals.

<Flash Control Sequence>

FIG. 4 is a sequence diagram illustrating the flash control according to the present exemplary embodiment. FIG. 4 illustrates the communication performed between the camera 100 connected to the master flash device, and the flash device control unit 203 and the wireless control unit 206 of the master flash device. Operations of the camera 100 can be realized by the camera control unit 103 controlling each unit based on the program and an input signal. In the description below, it is assumed that the flash device 200A serves as a master flash device, and the flash devices 200B and 200C serve as slave flash devices as illustrated in FIG. 3.

First, in step P401, when a user operates the operation unit 106, the camera 100 detects that a release button for capturing an image is fully pressed. In step P402, in response to the detection of the full-pressed release switch, the camera control unit 103 instructs, via the interfaces 104 and 204A, the flash device control unit 203A to execute flash preparation.

In step P403, after receiving the instruction for the flash preparation, the flash device control unit 203A instructs the wireless communication unit 206A to start a flash sequence. When the wireless communication unit 206A is instructed to start the flash sequence, in step P404, the wireless control unit 206aA prohibits software from performing reception processing. More specifically, if a certain command is input via the antenna 206bA, the wireless communication unit 206A prohibits the software from performing the processing corresponding to the command. Accordingly, an operation based on reception of an unexpected signal can be prevented from being executed during the image capturing sequence. Further, when the wireless communication unit 206A is instructed to start the flash sequence, in step P404, the wireless control unit 206aA suspends periodic transmission of a beacon. Then, in step P405, the wireless control unit 206aA notifies the flash device control unit 203A of a flash sequence starting acknowledgement (ACK).

Upon receiving the flash sequence starting ACK, in step P406, the flash device control unit 203A notifies the wireless control unit 206aA of setting information of various parameters for causing the flash devices 200B and 200C to flash. The parameters may include, as their specific contents, information pieces of flash modes such as an automatic light adjustment mode, a manual flashing mode, and a continuous flashing mode, a flashing light amount of the slave flash device, an aperture value and a shutter speed of the camera 100, an ISO value, and the like.

In step P407, upon receiving the flash parameter setting information, the wireless control unit 206aA causes the wireless communication unit 206A to shift from the reception mode to the transmission mode. In step P408, after shifting to the transmission mode, the wireless control unit 206aA transmits the flash parameter via the antenna 206bA to the slave flash devices 200B and 200C. In step P409, the wireless communication unit 206A shifts from the transmission mode to the reception mode after the transmission has been completed. After the wireless communication unit 206A has shifted to the reception mode, in step P410, the wireless control unit 206aA notifies the flash device control unit 203A of a flash parameter setting ACK.

In step P411, when receiving the flash parameter setting ACK, the flash device control unit 203A instructs the wireless control unit 206aA to suspend a transmission-reception operation performed by the wireless communication unit 206A. The instruction issued in this step is to cause the wireless communication unit 206A to shift to a transmission-reception suspension mode.

In step P412, the wireless control unit 206aA which has received the instruction for the transmission-reception suspension request causes the wireless communication unit 206A to suspend the transmission-reception function. Accordingly, the wireless communication unit 206A shifts from the reception mode to the transmission-reception suspension mode. In the transmission-reception suspension mode, a signal cannot be received at an RF circuit level even if the signal is transmitted from the wireless devices such as the wireless communication units 206B and 206C. In step P413, after the wireless communication unit 206A is shifted to the transmission-reception suspension mode, the wireless control unit 206aA notifies the flash device control unit 203A of a transmission-reception suspension request ACK.

In step P414, the flash device control unit 203A which has received the transmission-reception suspension request ACK determines that the flash preparation is completed, and notifies the camera control unit 103 of completion of the flash preparation.

In step P415, when the camera control unit 103 is notified of the completion of the flash preparation, the camera control unit 103 instructs, via the interfaces 104 and 204A, the flash device control unit 203A to perform the flash operation.

In step P416, upon receiving the instruction for the flash operation, the flash device control unit 203A instructs the wireless control unit 206aA to transmit a flash command.

In step P417, upon receiving the instruction to transmit the flash command, the wireless control unit 206aA causes the wireless communication unit 206A to shift from the transmission-reception suspension mode to the transmission mode. At this time, the wireless control unit 206aA causes the wireless communication unit 206A to shift directly to the transmission mode from the transmission-reception suspension mode without shifting through the reception mode. In order to realize the above-described processing, the flash device control unit 203A may transmit a command for forcibly returning the wireless communication unit 206A from the transmission-reception suspension mode to the transmission mode. This command may be provided as a command which is different from a signal for instructing the wireless communication unit 206A to return from the transmission-reception suspension mode to shift to the reception mode.

In step P418, immediately after shifting to the transmission mode, the wireless control unit 206aA transmits the flash command to the wireless communication units 206B and 206C via the antenna 206bA.

According to the present exemplary embodiment, the master flash device 200A can also flash along with the flashing of the slave flash devices 200B and 200C. Therefore, the flash device control unit 203A reads out presence or absence of a flash permission for the master flash device 200A from the non-volatile memory 207A. In a case where the flash permission is present, the flash device control unit 203A instructs the flash circuit 202A to perform the flash operation. As a result, in step P419, the master flash device 200A flashes along with the flashing of the slave flash devices 200B and 200C.

In step P420, after the flash operation, the flash device control unit 203A instructs the wireless control unit 206aA to complete the flash sequence.

In step P421, when the completion of the flash sequence is instructed, the wireless control unit 206aA causes the wireless communication unit 206A to shift from the transmission mode to the reception mode which may include periodic transmission of a beacon.

In step P422, after instructing the wireless control unit 206aA to complete the flash sequence, the flash device control unit 203A notifies the camera control unit 103 of completion of the flash operation via the interfaces 204A and 104. The flash sequence is completed when the camera control unit 103 is notified of the completion of the flash operation. An outline of the flash control performed by the master flash device 200A according to the present exemplary embodiment is described as the above.

As described above, according to the present exemplary embodiment, once the wireless communication unit 206A is shifted to the transmission-reception suspension mode, the wireless control unit 206aA will not cause the wireless communication unit 206A to shift to the reception mode until the wireless control unit 206aA transmits the flash command. The above-described control is performed due to the following reason.

If the wireless communication unit 206A shifts to the reception mode after the completion of the flash preparation, there is a possibility that the wireless communication unit 206A receives a signal such as a master search signal from other slave flash devices via the antenna 206bA. In this case, although the reception processing performed by the software is prohibited in step P404, the reception itself may still be performed. This may result in delay in the transmission processing of a flash signal. Therefore, according to the present exemplary embodiment, after the flash preparation has been completed, the wireless control unit 206aA prohibits the wireless communication unit 206A from shifting to the reception mode until the flash signal is transmitted so that the wireless communication unit 206A will not receive a signal from the other slave devices.

According to the present exemplary embodiment, a system including three devices such as the camera 100 connected to the flash device 200A, the flash device 200B, and the flash device 200C is described. However, the exemplary embodiment can be applied to a system including two devices or four or more devices.

Further, according to the present exemplary embodiment, the wireless control unit 206aA transmits the flash command only once in step P418. However, in order to prepare for the packet loss, the wireless control unit 206aA can transmit the flash command more than once. In this case, the wireless control unit 206aA transmits the flash command for a predetermined number of times while maintaining the wireless communication unit 206A in the transmission mode. After the transmission of the flash command for corresponding times, the wireless control unit 206aA may cause the wireless control unit 206A to shift to the reception mode.

Furthermore, according to the present exemplary embodiment, processing that is performed when the release button of the camera 100 is pressed is described as an example. However, the present exemplary embodiment is not limited thereto. For example, the present exemplary embodiment can be applied to flash control processing for light adjustment.

According to the first exemplary embodiment, the reception processing performed by the software is suspended when the release switch of the operation unit 106 of the camera 100 is fully pressed. Then, the wireless communication unit 206A is not shifted to the reception mode when the flash preparation is completed. In a second exemplary embodiment, attention is given to two pressing states of a release button, i.e., a full-pressed state and a half-pressed state, and the reception processing performed by the software is suspended when the release button is pressed halfway through. The present exemplary embodiment has much in common with the first exemplary embodiment. Therefore, parts unique to the present exemplary embodiment will be described and the descriptions of the common parts will be omitted.

<Flash Control Sequence>

FIG. 5 is a sequence diagram illustrating the flash control according to the present exemplary embodiment. First, in step P501, when a user presses the release button halfway through, the operation unit 106 inputs a control signal corresponding to the half-pressed release button to the camera control unit 103. In step P502, the camera control unit 103 notifies the flash device control unit 203A via the interfaces 104 and 204A that the release button has been halfway pressed.

In step P503, when the flash device control unit 203A is notified that the release button is halfway pressed, the flash device control unit 203A instructs the wireless control unit 206aA to prohibit the software from performing the reception processing.

When a request of the prohibition of the reception processing performed by the software is instructed, in step P504, the wireless control unit 206aA prohibits the software from performing the reception processing.

Then, in step P505, when the user fully presses the release button, the camera control unit 103 receives a control signal corresponding to the full-pressed release button. In step P506, the camera control unit 103 instructs, via the interfaces 104 and 204A, the flash device control unit 203A to execute flash preparation.

In step P507, upon receiving the instruction for the flash preparation, the flash device control unit 203A instructs the wireless control unit 206aA to start the flash sequence.

In step P508, the wireless control unit 206aA instructed to start the flash sequence causes the wireless communication unit 206A to suspend the periodic transmission of a beacon. The processing performed in step P509 through P526 is similar to the processing performed in step P405 through P422 in FIG. 4. Therefore, the descriptions thereof will be omitted. An outline of the flash control according to the present exemplary embodiment is described as the above.

As described above, according to the present exemplary embodiment, the reception processing performed by the software is prohibited at the timing when the release button is pressed halfway through, and the wireless communication unit 206A is shifted to the transmission-reception suspension mode at the timing when the release button is fully pressed. Accordingly, an effect of signal reception processing on the flash control can be reduced.

In addition to prohibiting the reception processing by the software at the timing when the release button is pressed halfway through, the wireless control unit 206aA may cause the wireless communication unit 206A to shift to the transmission-reception suspension mode. However, according to the present exemplary embodiment, the wireless control unit 206aA simply prohibits the reception processing by the software due to the following reasons.

First, if the wireless communication unit 206A shifts to the transmission-reception suspension mode, the transmission of beacon from the wireless communication unit 206A is suspended. If the beacon is not transmitted, the slave flash devices 200B and 200C cannot confirm the presence of the master flash device 200A. This may result in an unexpected communication error to occur. Since there is a possibility that the release button may be halfway pressed continuously for a long time, it is not preferable to suspend the transmission of beacon during that period.

Second, execution of the flash control is not determined during a period of the half-pressed state. Therefore, it is not realistic for the wireless communication unit 206A to repeatedly activate and suspend the communication function in such a state. For the above-described reasons, according to the present exemplary embodiment, the wireless communication unit 206A is not shifted to the transmission-reception suspension mode when the release button is pressed halfway through.

The exemplary embodiments according to the present invention are described above. However, the present invention is not limited to the above-described embodiments, and can be modified in various ways without departing from the gist of the present invention. For example, the camera 100 itself may include a wireless communication function to serve as a master flash device described in the above exemplary embodiments. Further, a wireless communication device that can be connected to a camera may serve as a master flash device described in the above exemplary embodiments. In addition, a role of a master flash device according to the above-described exemplary embodiments may be realized by connecting the wireless communication device to a flash device which does not have a wireless communication function.

Furthermore, in addition to the communication between the camera and the flash devices, the present invention may be applied to communication with other devices. For example, the present invention may be applied to a system in which communication is established between a first camera and a second camera, and when a release button of the first camera is operated, a release signal is transmitted to the second camera to capture an image in a cooperative manner therebetween.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. Each feature disclosed in the description, and (where appropriate) the claims and drawings may be provided independently or in any appropriate combination.

This application claims priority from Japanese Patent Application No. 2012-040484 filed Feb. 27, 2012, which is hereby incorporated by reference herein in its entirety.

What is claimed is:

1. A communication device adapted for use in an image capturing system including an image capturing device and at least one further device, the communication device comprising:
   an interface configured to communicate with the image capturing device;
   a wireless communication unit configured to wirelessly communicate with said at least one further device in the image capturing system;
   an input unit configured to receive control signals relating to said at least one further device in the image capturing system; and
   a shift unit configured to cause the wireless communication unit to shift to one of a plurality of operation modes including a reception mode for receiving a signal from another device, a transmission mode for transmitting a signal and not receiving a signal from another device, and a suspension mode in which transmission and reception a signal are not executed,
   wherein the control signals include a notification signal for starting a flash sequence, and a flash instruction signal that causes the wireless communication unit to transmit a flash command,
   wherein the shift unit causes the wireless communication unit to shift to the suspension mode in a case where the input unit receives the notification signal for starting the flash sequence,
   wherein, in a case where the input unit receives the flash instruction signal after shifting to the suspension mode, the shift unit causes the wireless communication unit to shift to the transmission mode, and
   wherein the wireless communication unit is adapted to transmit the flash command to said at least one further device after shifting to the transmission mode.

2. The communication device according to claim 1, further comprising a control unit configured to control software for processing a signal received by the wireless communication unit,
   wherein, in a case where the input unit receives the notification signal for starting the flash sequence after the wireless communication unit has been activated in the reception mode, the control unit performs control to limit the software processing based on a signal received by the wireless communication unit.

3. The communication device according to claim 1, wherein, in a case where setting of a flash parameter is completed after the input unit receives the notification signal for starting the flash sequence, the shift unit causes the wireless communication unit to shift to the suspension mode.

4. The communication device according to claim 1, further comprising a control unit configured to control software processing of a signal received by the wireless communication unit,
   wherein, in a case where the input unit receives a signal from the image capturing device in response to the image capturing device receiving an instruction for image capturing preparation, the control unit limits the software processing of a signal received by the wireless communication unit.

5. The communication device according to claim 1, further comprising:

a setting unit configured to set the communication device to operate either as a master for transmitting the flash command to said at least one further device in the image capturing system or a slave for receiving the flash command from said at least one further device in the image capturing system, wherein, after the setting unit sets the communication unit either as the master or the slave, the shift unit causes the wireless communication unit to activate in the reception mode.

6. The communication device according to claim 5, wherein the wireless communication unit is adapted periodically to shift to the transmission mode to transmit a beacon in a case where the setting unit sets the communication unit to operate as a master.

7. The communication device according to claim 1, wherein the shift unit causes the wireless communication unit to shift from the transmission mode to the reception mode after the flash command is transmitted.

8. The communication device according to claim 1, wherein the communication device is built into the image capturing device.

9. The communication device according to claim 1, wherein the communication device is a flash device which is connectable to the image capturing device.

10. The communication device according to claim 1, wherein the communication device is connectable to a flash device that is connected to the image capturing device, and wherein the communication unit communicates with the image capturing device via the flash device.

11. The communication device according to claim 1, wherein in a case where the input unit receives the flash instruction signal after the wireless communication unit is caused to shift to the suspension mode, the shift unit causes the wireless communication unit to shift from the suspension mode to the transmission mode, not through the reception mode.

12. A communication device in a system including a first device and a second device, the communication device comprising:

a communication unit configured to communicate with the first device;

a wireless communication unit which is other than the communication unit and is configured to wirelessly communicate with the second device;

an input unit configured to receive control signals; and a shift unit configured to cause the wireless communication unit to shift to any of a plurality of operation modes including a reception mode for receiving a signal from another device, a transmission mode for transmitting a signal and not receiving a signal from another device, and a suspension mode in which transmission and reception a signal are not executed, wherein the control signals include a notification signal for starting a flash sequence, and a flash instruction signal that causes the wireless communication unit to transmit a flash command, wherein the shift unit causes the wireless communication unit to shift to the suspension mode in a case where the input unit receives the notification signal for starting the flash sequence, wherein, in a case where the input unit receives the flash instruction signal after shifting to the suspension mode, the shift unit causes the wireless communication unit to shift to the transmission mode, and wherein the wireless communication unit transmits the flash command at least to the second device after shifting to the transmission mode.

13. A method for controlling a communication device in an image capturing system including an image capturing device and at least one further device, wherein the communication device includes an interface for communicating with the image capturing device, and a wireless communication unit capable of shifting between operation modes including a reception mode for receiving a signal from another device, a transmission mode for transmitting a signal and not receiving a signal from another device, a suspension mode in which transmission and reception a signal are not executed, wherein the communication device receives control signals, the control signals including a notification signal for starting a flash sequence, and a flash instruction signal that causes the wireless communication unit to transmit a flash command, the method comprising:

in response to receiving, at the communication device, a control signal relating to said at least one further device in the image capturing system, shifting the wireless communication unit to the suspension mode in a case where the received control signal is the notification signal for starting the flash sequence, and shifting the wireless communication unit to the transmission mode in a case where the communication device receives the flash instruction signal after shifting to the suspension mode; and subsequently transmitting the flash command to said at least one further device.

14. A non-transitory computer-readable recording medium storing a program for causing a communication device to execute a method according to claim 13.

* * * * *